Patented June 16, 1942

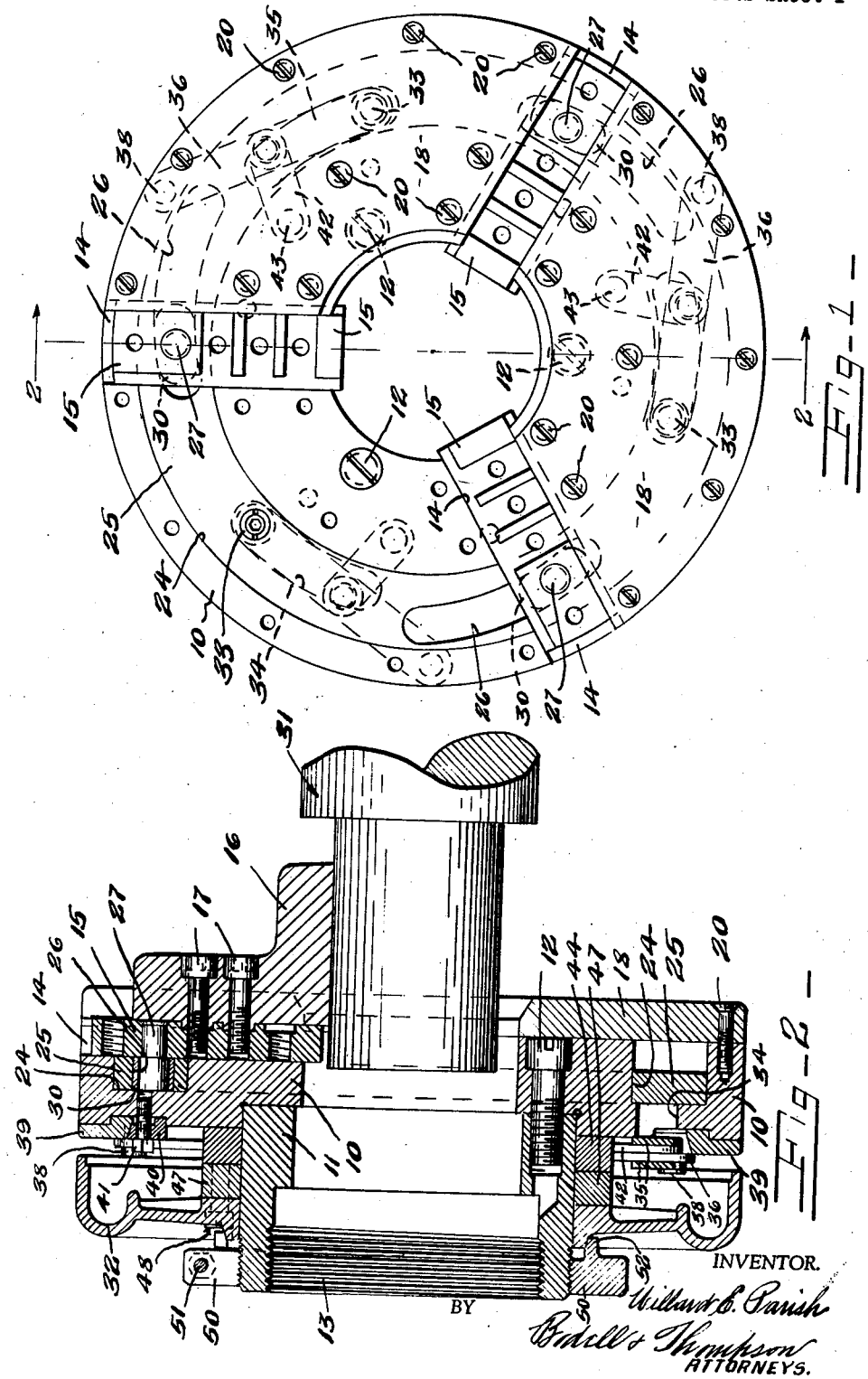

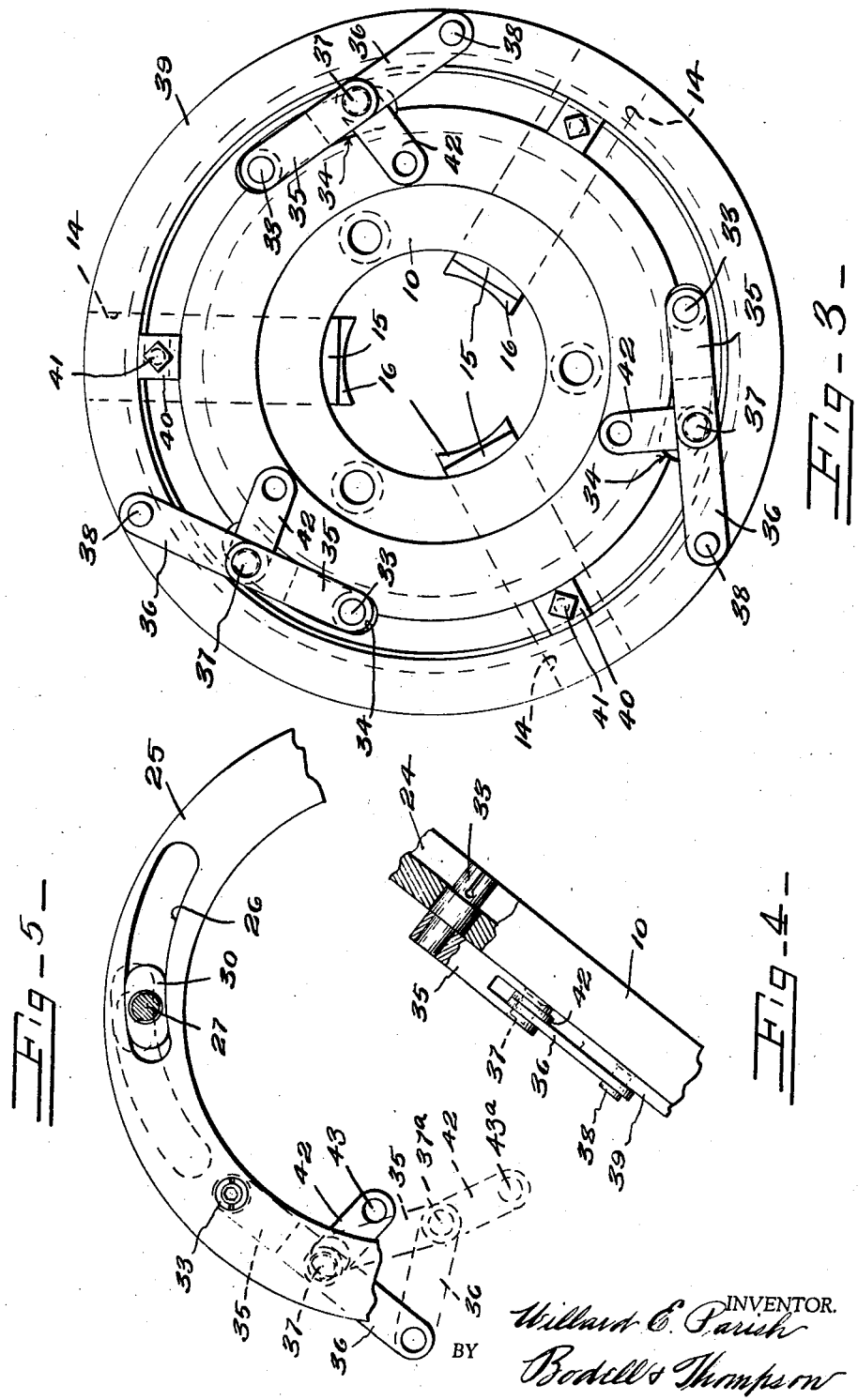

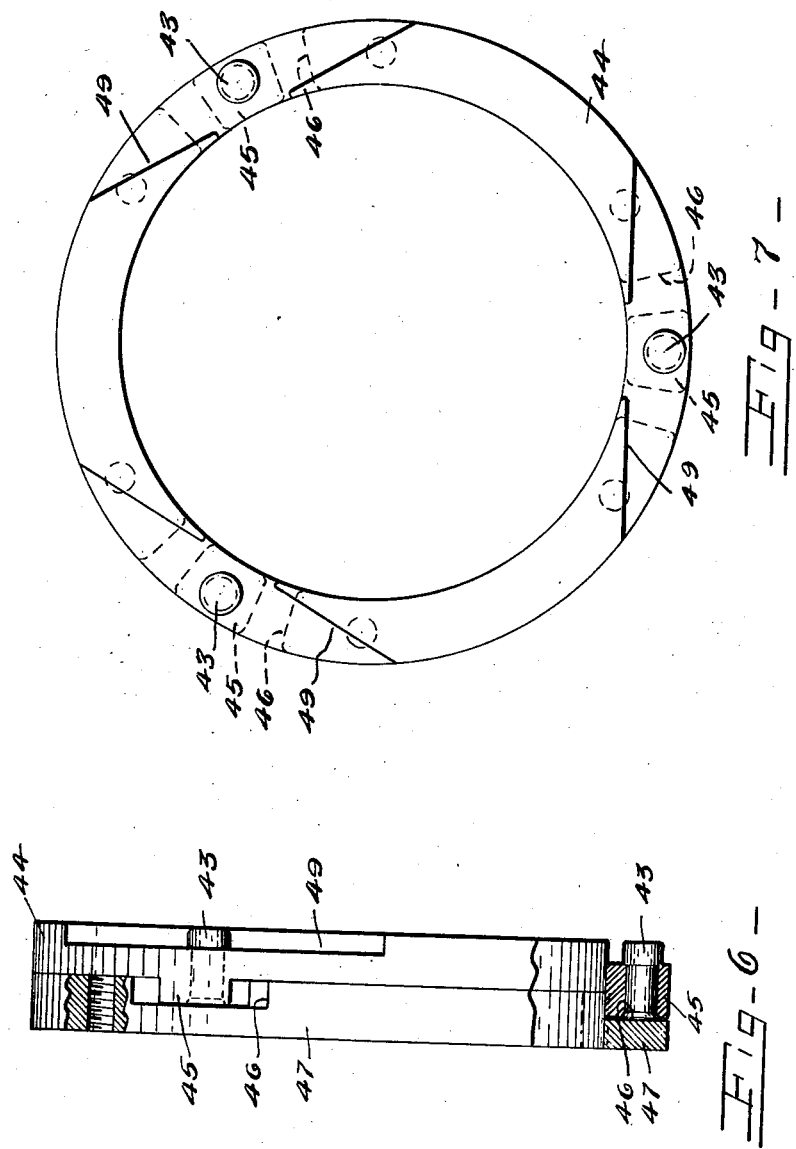

2,286,927

UNITED STATES PATENT OFFICE 2,286,927

ROTARY CHUCK

Willard E. Parish, Syracuse, N. Y.

Application March 4, 1941, Serial No. 381,712

4 Claims. (Cl. 279—118)

This invention relates to work holding chucks for use on lathes and similar machine tools, the chuck being rotated as distinguished from machines wherein the work holding chuck remains stationary or fixed and the cutting tool is rotated about the work.

More particularly the invention has to do with a chuck of the type referred to intended particularly for the production of like parts in large volume wherein the work holding jaws have only sufficient movement to grip and release the work as distinguished from the ordinary lathe chuck wherein the jaws are movable over the entire range or capacity of the chuck.

The invention is directed specifically to mechanism for effecting the radial movement of the work holding jaws without the necessity of using a wrench or other tool, whereby the chuck may be loaded and unloaded with the minimum of time and effort on the part of the operator.

The invention consists in the novel features and in the combinations and constructions hereinafter set forth and claimed.

In describing this invention, reference is had to the accompanying drawings in which like characters designate corresponding parts in all the views.

Figure 1 is a front elevational view of a chuck embodying my invention.

Figure 2 is a vertical sectional view taken on line 2—2, Figure 1.

Figure 3 is a rear elevational view of the chuck with the operating hand wheel and other parts removed.

Figure 4 is a fragmentary side elevational view with parts in section.

Figure 5 is a fragmentary front elevational view of the cam ring looking to the left in Figure 2 and including a toggle link and a jaw actuating pin.

Figure 6 is a side elevational view of the toggle operating ring and contiguous portion of the hand wheel with parts broken away and parts in section.

Figure 7 is a rear elevational view of the toggle operating link.

The chuck comprises an annular body member 10 including a back member 11 to which the body is secured as by means of screws 12. The back member 11 is threaded as at 13 for attachment to the rotating spindle of a lathe, or other machine tool. The face of the body member is formed with a plurality of radially extending grooves 14 in each of which a jaw 15 is slidably mounted.

A work engaging member or an extension jaw 16 is secured to each of the jaws 15 as by screws 17, and the jaws 15 are retained in the slots 14 by segmental members 18 secured in place as by screws 20. The segmental members 18 overlap the face of the jaws adjacent each edge thereof and thereby serve to retain the jaws in the slots or grooves 14. In Figure 1, the upper left segmental portion 18 has been omitted to more clearly show the construction, which up to this point is more or less conventional in chucks of this kind.

The body 10 is formed with an annular recess in which a cam ring 25 is rotatably mounted. This cam ring is formed with an arcuate slot 26, there being one of such slots for each jaw 15, and the slots 26 are formed eccentric with the axis of the body. Each of the jaws 15 is provided with a pin 27 projecting rearwardly into the slots 26. An elliptical shaped bushing 30 is mounted on the rearwardly projecting portion of each of the pins 27 and the arrangement is such that when the cam ring 25 is rotated in one direction relative to the body, the jaws 15 are caused to move inwardly toward the axis of the body, and when the cam ring is rotated in the opposite direction the jaws are urged outwardly. Referring to Figure 1, the jaws are moved inwardly when the cam ring 25 is rotated in a clockwise direction, and moved outwardly when the ring is rotated in a counter-clockwise direction. In this figure, the ring is shown as having been rotated in a clockwise direction and with the jaws moved inwardly to a position engaging the work 31.

The cam ring 25 is rotated by a toggle linkage which is actuated by the hand wheel 32 freely mounted upon the back member 11. The cam ring 25 is provided with a plurality of pins 33 extending rearwardly through arcuate slots 34 formed in the chuck body.

A link 35 is pivotally mounted at one end to each of the pins 33, and at its opposite end to a link 36, by pin 37, the other end of which is pivotally mounted upon a pin 38 projecting from a ring 39 mounted on the rear face of the body 10 and being adjustable circumferentially thereof and being secured in adjusted position by a clamp 40 actuated by a screw 41 threading into the body. The pivoted ends of the links 35, 36 are also pivotally connected to one end of a link 42 which extends in a general direction radially inwardly and is pivotally connected at its inner end to a pin 43 carried by an annular member 44 rotatably mounted on the back member 11.

The arrangement of this linkage is such, that rotation of the annular member 44 effects movement of the toggle formed by the links 35, 36 into and out of straightened position and accordingly effects rotation of the cam ring 25.

The annular member 44 is formed with one or more projections 45 extending into notches 46 formed in a ring 47 secured to the hub of the hand wheel as by screws 48. The notches 46 are of appreciably greater width than the projections 45 for the purpose hereinafter stated. The annular member 44 is cut away as at 49 in order to provide proper clearance for the functioning of the link 42. The hand wheel 32 is retained against rearward axial movement on the member 11 by means of a split nut 50 threaded upon the member 11 and held in adjusted position by contracting screw 51. The nut 50 is formed with an annular flange 52 engaging the hub of the wheel cam fashion, whereby the nut 50 may be employed to clamp the hand wheel to the back member 11 under certain conditions.

It will be apparent, from the description, that it is only necessary for the operator to grasp the hand wheel 32 and rotate it in a counter-clockwise direction, Figure 1, to release the work 31 from the chuck jaws 15, 16. In so doing, the annular member 44 is moved in a counter-clockwise direction causing the toggle links 35, 36 to break inwardly, as indicated in dotted outline Figure 5. This taking place because the pivot pin 38 is fixedly secured to the body of the chuck and the pivot pin 43 is moved in a counter-clockwise direction to the position 43ª causing the toggle pin 37 to move to the position 37ª and the cam ring pin 33 to substantially assume the position previously occupied by the toggle pin 37 thus effecting counter-clockwise rotation of the cam ring 25 which, through the medium of the slots 26, effects outward movement of the jaws 15.

To engage the work, it is only necessary for the operator to rotate the hand wheel 32 in a clockwise direction Figure 1, causing the toggle links 35, 36 to assume a straight position and thus rotating the cam ring 25 in a clockwise direction. Because of the arrangement of the toggle mechanism, a slight pressure on the hand wheel 32 effects a substantial gripping pressure on the jaws 15, which pressure increases as the toggle approaches the straight line position.

It will be understood that in machining operations the chuck operates in a counter-clockwise direction Figure 1, and accordingly the inertia of the hand wheel 32 tends to straighten the toggle to effect inward movement of the jaws 15. Accordingly, if the machine should be started up without tightening the hand wheel 32, the jaws will grip the work sufficiently to hold it in place and prevent it from being thrown out of the chuck, with the possibility of injury to the operator, or damage to the machine.

The purpose of the projections 45 on the annular member 44, and the enlarged notches 46 in the hand wheel ring 47, is to conserve the effort of the operator in manipulating the chuck by permitting the ring 44 to be struck with the inertia of the hand wheel. This striking of the operating ring permits the toggle to be straightened under great pressure and to be opened with a minimum amount of effort on the part of the operator. This arrangement also prevents the temptation of grasping the hand wheel 32 previous to the time the chuck has stopped rotating. Such procedure would be of no assistance in opening the chuck but, on the other hand, would tend to tighten the jaws more securely against the work.

Initially the jaw extensions 16 are adjusted, or machined, to approximately the correct size to tightly grip the work 31 when the toggle linkage is in straightened position. However, if it is found that in actual operation the extensions grip the work prematurely to the straightening of the toggle, or that they do not engage the work with sufficient pressure when the toggle is straightened, the clamp 40 is loosened and the ring 39 is adjusted circumferentially of the body which, in effect, produces a circumferential adjustment of the cam ring 25. When the proper adjustment is made, the clamp 40 is tightened to maintain the ring 39 in adjusted position. By this means, work of varying sizes may be properly gripped by the chuck.

As described, the chuck is arranged for gripping work externally. If it is desired to grip work internally, the segmental sections 18 and the jaws are removed and the cam ring 25 is reversed, whereby the eccentric slots 26 extend in the opposite direction. This permits the jaws 15 to be moved radially outwardly during movement of the toggle linkage from broken to straightened position.

What I claim is:

1. A rotary chuck for lathes and the like comprising a body, a plurality of work holding jaws carried by the body and being movable radially thereof into and out of work engaging position, toggle mechanism carried by the body and being operable to move said jaws, an annular member rotatably mounted upon the body and being operatively connected to said toggle mechanism to effect operation thereof, a hand wheel rotatably mounted upon the body, and a lost motion connection between said hand wheel and said annular member.

2. A rotary chuck for lathes and the like comprising a body, an annular member rotatably mounted upon the body, a hand wheel rotatably mounted upon the body and being operatively connected to said annular member, a plurality of work holding jaws carried by the body and being movable radially thereof, a cam ring rotatably mounted in the body and being operable upon rotation to effect radial movement of said jaws, a link pivotally mounted at one end to said cam ring, a second link pivotally mounted at one end to the body, the opposite ends of said links being pivotally joined together and to a third link, the opposite end of said third link being pivotally secured to said annular member, said first and second links forming a toggle operable to effect rotation of said cam ring upon rotation of said annular member relative to the body by said hand wheel.

3. A rotary chuck for lathes and the like comprising a body, a plurality of work holding jaws mounted on the body for radial movement, a cam ring rotatably mounted in the body and operable upon rotation to move said jaws into and out of work engaging position, a toggle pivotally connected to said ring and to the body and being operable when actuated to effect rotation of the cam ring relative to the body, a hand wheel rotatably mounted on the body, motion transmitting means connecting the hand wheel and said toggle to actuate the same, and means operable to adjust the pivot point of the toggle on the body circumferentially thereof.

4. A rotary chuck for lathes and the like comprising a body, a plurality of work holding jaws mounted on the body for radial movement, a cam ring rotatably mounted in the body and operable upon rotation relative to the body to move said jaws into and out of work engaging position, a toggle pivotally connected to said cam ring and pivotally connected to an annular member adjustable circumferentially of the body, said toggle being operable when actuated to effect rotation of the cam ring relative to the body, a hand wheel rotatably mounted on the body, motion transmitting means connecting the hand wheel and said toggle to actuate the same, and means for detachably locking said annular member to the body.

WILLARD E. PARISH.